Figure 1:
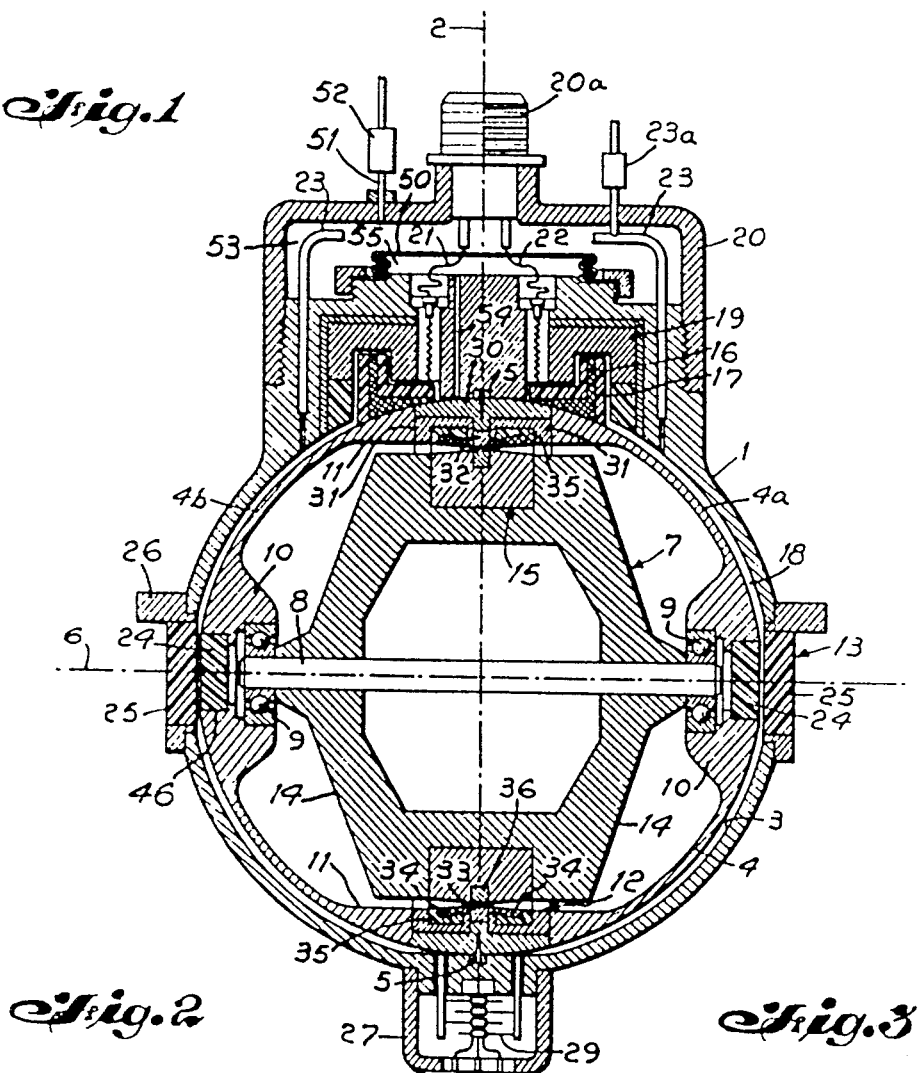

March 21, 1967    P. R. ADAMS ET AL    3,309,931

GYROSCOPE

Filed June 26, 1963    2 Sheets-Sheet 1

INVENTORS.
PAUL R. ADAMS
BY CARLOS C. MILLER, Jr.
RICHARD S. BOVITZ

Isadore Bogart
ATTORNEY

March 21, 1967 P. R. ADAMS ET AL 3,309,931
GYROSCOPE
Filed June 26, 1963 2 Sheets-Sheet 2

INVENTORS.
PAUL R. ADAMS
CARLOS C. MILLER, Jr.
BY RICHARD S. BOVITZ

ATTORNEY

United States Patent Office 3,309,931
Patented Mar. 21, 1967

3,309,931
GYROSCOPE
Paul R. Adams, Upper Montclair, N.J., and Carlos C. Miller, Jr., Northridge, and Richard S. Bovitz, Los Angeles, Calif., assignors to International Telephone and Telegraph Corporation, Nutley, N.J., a corporation of Maryland
Filed June 26, 1963, Ser. No. 290,683
14 Claims. (Cl. 74—5.6)

This invention relates to gyroscopes and more particularly to balanced gyroscopes incorporating a symmetrical construction.

It is known that in inertial navigation systems, the greatest uncertainties in navigation of long-range vehicles from inertial guidance are due to drifts and uncertainties in the gyroscope used in the systems.

It also appears that the drifts of the best available systems are due largely to unequal heating and unequal heat conduction paths which produce distortions within the system.

There are two different kinds of distortions that result from heating. The first is produced when there are two supposedly symmetric heat sources which differ slightly (or one extensive source which is asymmetrical) and the second pertains when the thermal conduction paths on the two sides of a single source are unequal. In both cases, a mass shift is caused by one side of the rotating mass and supporting structure experiencing more heating than the other side. This causes the effective center of mass to depart from the ideal position and thereby produce a precession torque. Other deficiencies which contribute to inefficiency of gyroscope construction and design and cause drift and inaccuracy of navigation are flexible lead torques which are due to the necessity of conducting power to the motor and for detecting precession movements of the gyroscope. This factor contributes about one-half dyne centimeter of torque.

An object of this invention is to provide an improved gyroscope which overcomes or greatly minimizes the aforementioned drift difficulties.

Another object is to reduce the heat gradients which cause major random drift errors by the novel construction of the motor which drives the gyroscope rotor.

Still another object is to provide a gyroscope having a thermally symmetrical structure and simultaneously having very low impedance heat conduction paths to reduce the magnitude of the thermal drops to a very low value; whereby the magnitude of any temperature unbalance is doubly reduced (first by the reduction in the drops and second by their low percentage of unbalance).

A feature of this invention is a gyroscope comprising a housing and gimbal means rotatably disposed within the housing. The gimbal means carry a motor stator therein and a gyrowheel is disposed centrally within the gimbal means. The gyrowheel carries a motor rotor in juxtaposed relation to the stator and all these parts of the gyroscope are symmetrically disposed relative to a critical plane containing the gimbaling axis of the gyroscope and preferably have roughly the forms of symmetrical surfaces of revolution.

Another feature is that the rotor and stator comprise first and second concentric annuli symmetrically disposed in the center of such gyroscope with the axis of the annuli coinciding with the axis of the gyrowheel.

An important feature is that both these annuli are thin rings whose O.D./I.D. ratio is less than 1.4/1 and preferably less than 1.3/1. A particular important feature is that the outer annulus—which is the stator—is an extremely thin ring whose O.D./I.D. ratio is less than 1.33/1 and preferably less than 1.2/1, thus permitting a right-side-out configuration with perfect thermal symmetry with very little sacrifice of moment-of-inertia of the rotary member of the gyro.

Figure 2:
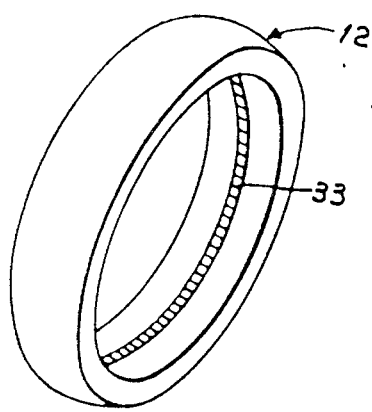
Figure 3:
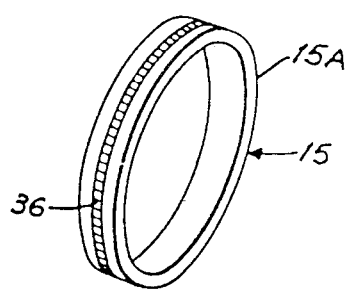
Figure 5:
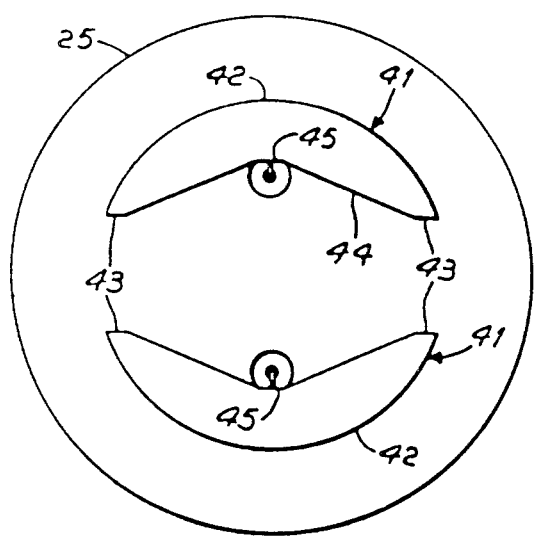
Figure 4:
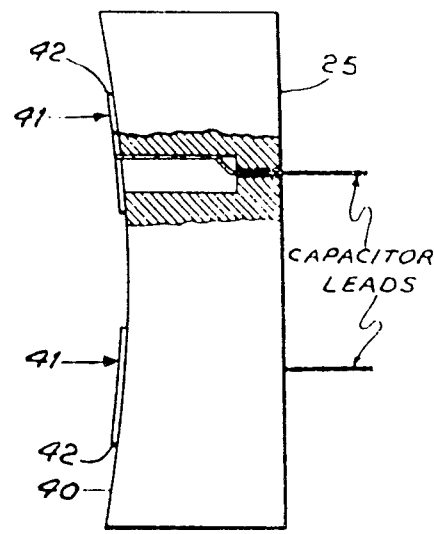
Figure 6:
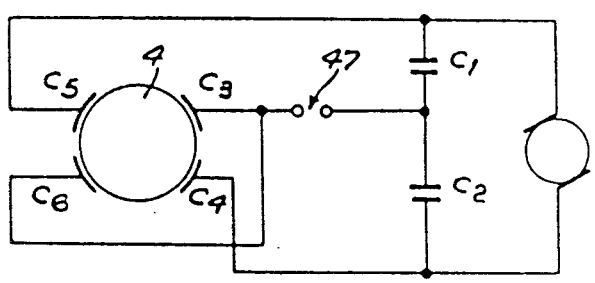

These and other features and objects will become more apparent by reference to the following description taken in conjunction with the accompanying drawings, in which:

FIG. 1 shows a cross section view of the gyroscope of this invention;
FIG. 2 is an isometric view of the motor stator;
FIG. 3 is an isometric view of the motor rotor;
FIG. 4 is a side elevation view partly in section of the capacitance pick-off assembly;
FIG. 5 is a plan view of the capacitance pick-off assembly; and
FIG. 6 is the circuit diagram of the electrostatic pick-off sensing means of this invention.

Referring now to FIG. 1, there is shown the gyroscope of this invention comprising a housing 1 which is symmetrically disposed about an axis 2. The inside 3 of the housing 1 comprises a spherical chamber in which is rotatably disposed a gimbal 4 of a corresponding spherical shape with the chamber 3 and mounted for rotation about the gimbaling axis 2 within the spherical chamber 3 by means of jeweled gimbal bearings 5. Inside of the spherical gimbal 4 and disposed with precise mirror symmetry about a critical plane (which contains the gimbaling axis 2 and which is perpendicular to the spin axis 6) is a gyrowheel 7 mounted for spinning therein about the axis 6 and rotationally symmetric about this axis. The gyrowheel 7 is disposed for spinning about the axis 6 by means of shaft 8 and is supported at both ends by ball bearings 9 which are carried by the gimbal 4. The gimbal 4 is a sphere on the outside surface and is substantially spherical on the inside except for the axial ends 10 which carry the ball bearings 9 and the curved annular section 11 of the gimbal 4 which is also precisely symmetric about the critical plane (perpendicular to axis 6 and containing the axis 2). The annular section 11 carries therein an annular member 12 or motor stator which is also precisely symmetrical about the critical plane of thermal symmetry (the central plane containing gimbaling axis 2 and perpendicular to spin axis 6) as well as about this axis 6. Opposite the ends 10 of the gimbal 4 are located capacitive pick-off members 13. In effect, the gimbal 4 comprises two hemispherical-shaped members 4a, 4b which are fastened (by cementing with a very thin film of cement having fair thermal conductivity) to an equatorial section; i.e., the motor stator 12, to form the spherical gimbal 4. The gyrowheel 7 consists of two oppositely disposed end bell members 14 which are securely cemented together (with thin films of thermally conductive cement) and to the shaft 8 and a motor rotor 15. As shown the rotor 7 is substantially a cylinder with frustoconical ends, the diameter of which is longer than the axial length. The rotor is contained in the inner cavity of the spherical gimbal 4 and is in a near vacuum to avoid frictional windage effects. The motor rotor 15 is an annulus which is concentric with the motor stator annulus 12 and symmetrical about axis 6 and also about the plane perpendicular to axis 6 and containing axis 2 as are the other parts of the gyrowheel 7. A moving coil torquer 16 is symmetrically disposed about the axis 2 at one end 11 of the gimbal 4. The moving torquer coil 16 is supported within dielectric member 17.

The gimbal is supported within the spherical chamber 3 by means of flotation fluid which fills the gap 18 between the inner surface of the housing 1 and the corresponding outer surface of the gimbal 4. The jeweled gimbal bearings 5 are located within the flotation chamber of the gyro so that lubrication is positive and there is no problem of lubrication retention. This space gap 18 also separates the moving coil torquer 16 and its supporting member 17 from the matching structure 19 in the housing 1 which cooperates with the moving coil torquer, so that there is a continuous gap 18 between the gimbal 4 and the housing 1, the sole point of contact between the two members being the jeweled bearings 5 which permit the gimbal member 4 to rotate about the axis 2. A cylindrical housing 20 is provided at the top end of the housing 1 wherein is included the torque member 19 and the electrical connections which are to be made to the moving torquer coil 16. At the top center of the housing 20 there is located an electrical connector 20a and leads 21 and 22 therefrom connect with the moving coil 16. A tube 23, shown in partial view, is utilized to supply flotation fluid to the gap 18 between the gimbal 4 and the housing 1, by means of the outer connection 23a.

Capacitive pick-off members 24 are located within the ends 10 of the gimbal 4. At the ends of the housing 1 which are disposed about the axis 6 are located cylindrical dielectric members 25 disposed opposite corresponding dielectric members 24 in the gimbal 4. Dielectric members 25 carry the capacitive pick-off elements that will be described in detail. A mounting ring 26 is used for supporting the gyroscope in the required system. At the bottom end of the housing 1 is a member 27 symmetrically disposed about the axis 2, which carries an electrical connector 28 which is utilized to bring the current to the motor stator 12 by means of flexible connecting leads 29.

This gyroscope is unique by virtue of provisions that have been made for providing a symmetrical structure and also a symmetrical iron copper flux density arrangement within the motor itself. As can be seen from the drawing, the supporting structures and the gyrowheel 7 are exactly symmetrical surfaces of revolution. The motor stator 12 and the rotor 15 are located annularly in a plane through the center of the rotating mass or gyrowheel which allows any heat losses to be conducted equally in all directions. It should be noted that the motor construction is "right-side-out," i.e., the motor stator is outside of the rotor, instead of having the rotor outside as in most modern gyros. Thus the stator (which produces the most heat) is imbedded directly in the gimbal member itself rather than being inside the wheel; this allows heat generated by the stator windings and the stator iron losses to be conducted through very short, large-area heat paths into the flotation fluid which fills the space 18. This produces much lower thermal drops than is possible in the known gyroscopes used today. At the same time, these drops are very accurately symmetrical so that the total temperature unbalance is a very small percentage of a very small drop; thus giving an absolute temperature unbalance of much less than ½ degree. The motor comprising the stator 12 and the rotor 15 is an A.C. induction-type motor which transfers energy to the rotor 15 only by induction. The rotor 15 is of the squirrel cage design for maximum efficiency. The induction-type motor is preferred because it gives better starting torques for a given weight of iron than the hysteresis type while also providing a low magnetic reluctance (to reduce stator ampere turns). As shown, the stator 12 and the rotor 15 are perfectly symmetrical about the spin axis 6. The electrical symmetry of the motor is achieved by using a balanced three-phase lap winding with an integral number of slots per pole per phase on the stator. The rotor 15 as shown in FIGS. 1 and 3 consists of a very thin, narrow annular stack 36 of laminated iron imbedded in a thicker, wider cast-in-place silver annulus 15A (which also extends through slots in the laminated iron so as to form a one-piece silver squirrel case winding.) This rotor 15 is supported between end bells 14. It should be noted that the rotor 15 and stator 12 of the motor are constructed of a minimum amount of material foreign to the principal structural material of the complete gyro which is aluminum or beryllium. The epoxy-imbedded copper wire material of the stator windings, and the laminated iron material of both rotor and stator are held to especially small volumes and weights because their filamentary and laminated constructions make these materials somewhat unstable dimensionally as well as non-isotropic and non-homogeneous in thermal conductivity.

Also the stator and rotor are both proportioned so that their thermally significant "(root area)/(length)" ratios are extremely large. More particularly their "trans-symmetry lengths" (i.e., their lengths perpendicular to the plane of critical thermal symmetry—or parallel to the spin axis) are less than ⅙ as large as the square root of their "trans-gradient areas" (i.e., the areas transverse to the direction of heat flow). Thus the trans-symmetric thermal impedance of each of these two motor elements is at least ten times lower than the impedance of a cube of the same volume and of similar material (i.e., laminated iron and silver, or copper and laminated iron molded in epoxy resin). For the stator which gives off most of the heat, the thermally significant "(root area)/(length)" ratio is greater than 10 so that the trans-symmetric thermal impedance is at least 20 times lower than the impedance of an equal-volume cube of similar material.

These extremely short and fat proportions of the motor's rotor and stator combined with a design using only one stator and one rotor (each centered on the plane of symmetry) cooperates with the precisely symmetric and very low thermal impedance paths for conducting the heat from the stator to reduce the temperature asymmetry to a value which is too low to measure accurately, but which is computed to be much less than one-half degree Fahrenheit between any two symmetrically positioned regions.

In this gyroscope it is preferred to use a driving current frequency between 1,000 c.p.s. and 2,000 c.p.s. with rotor and stator laminations being thin enough to give a total core loss in the neighborhood of one watt per pound.

Referring to FIGS. 1 and 2, the complete stator 12 is shown as comprising an outside support ring 30 and two adjacent clamping rings 31 which serve to retain the lamination stack 32 in place. The lamination stack, as shown more particularly in FIG. 2, when finished, comprises an integral number of poles 33 equally spaced about the inside of the stator 12. The coils 34 are disposed about the poles 33 of the laminations around the circumference thereof and the whole assembly is completely encapsulated with an epoxy resin 35 which fills the space between the coils 34 and the poles 33 so that the appearance of the inside surface of the stator is completely smooth with the exception of the machined exposed surfaces of the poles 33.

Referring now to FIGS. 4, 5 and 6, there is shown the electrostatic pick-off means of this gyro. The dielectric member 25 is disposed in the housing 1 on each end of the axis 6. On the curved side 40 of the member 25 are disposed two capacitor plates 41 concentric with the center of the member 25. Each plate 41 is formed substantially in the shape of a crescent, the outer edge 42 being circular and parallel with the periphery of the member 40. The inner boundary of the crescent comprises a straight edge 43 at the ends, a straight edge deviating angularly from the straight edge 43 and meeting another straight portion 45 at the center of the crescent which is parallel to the straight portion 43 at the crescent ends. The hole 46 in the gimbal 4 which is plugged by the dielectric member 24, is concentric with the capacitor plates 41. With this configuration, stray capacities in the pick-off are kept at a minimum, with the "fringing" capacity playing an important role.

FIG. 6 shows the capacitive pick-off system in the form of a bridge circuit utilizing the gimbal 4. C5 and C6 may be considered equivalent to one pair of capacitor plates 41 as shown in FIG. 5, and C3 and C4 another pair oppositely disposed on the axis 6. C1 and C2 are the fixed impedance arms of the bridge, which becomes unbalanced when the gimbal 4 precesses and a signal voltage is produced at the output 47.

In order to minimize the pressure variations caused by slight expansions and contractions of the flotation fluid, the gyro has a pressure-relief diaphragm 50 extending into a relatively large air space 53. An air intake 51 with valve 52 is provided, through which air is introduced into the space 53 thus initially adjusting the forces in the gyroshell to set the desired preload on the bearings. The fluid in space 18 can expand when heated and flow through the tube 54 into the space 55 enclosed by the diaphragm 50 and this gives very little pressure change because of the relatively large volume of air space 53 compared with the small expansion of the fluid.

The novel construction of this gyroscope may even eliminate the artificial heating heretofore required in order to keep the operating temperatures constant in spite of variation in temperature. The symmetric location of the motor together with its extremely short-and-fat proportions, plus the low and symmetric thermal impedances of the two halves of the spherical gimbal 4, all insure both a low percentage of unbalance of thermal drops and also unusually low values of these drops. These two low factors then act in cascade, being multiplied together to give an extraordinarily low value of temperature unbalance.

While we have described above the principles of our invention in connection with specific apparatus, it is to be clearly understood that this description is made only by way of example and not as a limitation to the scope of our invention as set forth in the objects thereof and in the accompanying claims.

We claim:

1. A gyroscope comprising a housing having a spherical inner surface, gimbal means including a hollow sphere with the outer surface corresponding with said inner surface of said housing and spaced apart therefrom, means supporting said gimbal means for rotation about a gimbaling axis within said housing, a motor stator comprising a first annulus being an equatorial section of said gimbal means, a gyrowheel disposed centrally within said gimbal means, a motor rotor comprising a second annulus concentric with said first annulus carried by said gyrowheel, said rotor being adapted to be driven by magnetic fields produced by said stator when said stator is energized, floatation fluid filling the space between said housing and said gimbal means and supporting said gimbal means from said housing, all parts of said gimbal means, stator gyrowheel, and rotor being symmetrically disposed relative to one critical plane containing said gimbaling axis.

2. A gyroscope according to claim 1 wherein the hollow of said gimbal means is in a near vacuum.

3. A gyroscope according to claim 1 wherein said stator further comprises a balanced three phase lap winding having ten poles and three slots per pole phase.

4. A gyroscope according to claim 1 wherein said annuli are thin rings whose O.D./I.D. ratio is less than 1.4/1 and preferably less than 1.3/1.

5. A gyroscope according to claim 1 wherein said stator is a thin ring whose O.D./I.D. ratio is less than 1.33/1 and preferably less than 1.2/1.

6. A gyroscope according to claim 1 wherein said stator is proportioned so that its axial length transverse to said one plane is less than 1/6 as large as the square root of its area parallel to said one plane, whereby its transymmetric thermal resistance is less than 1/10 that of an equal-volume cube of similar material.

7. A gyroscope according to claim 1 wherein each one of said stator and said rotor is proportioned so that its axial length transverse to said one plane is less than 1/6 as large as the square root of its area parallel to said one plane, whereby its transymmetric thermal resistance is less than 1/10 that of an equal-volume cube of similar material.

8. A gyroscope according to claim 1 wherein the axial length of said stator transverse to said one plane is less than 1/10 as large as the square root of the area of said stator and of said rotor and parallel to said one plane, whereby the transymmetric thermal conductance of said stator is 20 times greater than that of an equal-volume cube of similar material.

9. A gyroscope according to claim 1, further including pick-off means to detect any precession movement of said gyrowheel.

10. A gyroscope according to claim 9 wherein said pick-off means comprises a plurality of capacitor plates symmetrically disposed about said spin axis at each end thereof, each said capacitor plate having substantially the shape of a crescent with the convex edge thereof being disposed away from said spin axis, and the inner edge of said capacitor plate comprising two straight end portions, a straight middle section and angularly displaced straight portions connecting said end portions to said middle section.

11. A gyroscope according to claim 10 wherein said pick-off means further comprise a source of alternating current and a pair of fixed impedances to comprise together with an opposed pair of said capacitor plates an alternating current bridge whereby an output signal is derived indicative of said precession movement.

12. A gyroscope comprising a housing having a spherical cavity, a hollow spherical gimbal disposed within said housing for rotation therein and spaced apart from the spherical surface of said cavity with the outer surface of said gimbal corresponding substantially to said spherical surface of said cavity, flotation fluid filling the space between said housing and said gimbal and supporting said gimbal from said housing, a gyrowheel disposed centrally within said gimbal, means disposing said gyrowheel for rotation within said gimbal about a spin axis substantially normal to the axis of rotation of said gimbal relative said housing, said gyrowheel comprising a hollow substantially cylindrical body with frusto-conical end members, an annular motor stator disposed on the inner surface of said gimbal at the mid-section thereof, an annular motor rotor disposed on said gyrowheel adjacent said motor stator for coaction therewith, said rotor being adapted to be driven by magnetic fields produced by said motor stator when said motor stator is energized, all parts of said gimbal and said gyro being symmetrically disposed relative said spin axis of said gyroscope and constituting symmetrical surfaces of said revolution.

13. A gyroscope comprising a housing having a spherical cavity, a hollow spherical gimbal disposed within said housing for rotation therein and spaced apart from the spherical surface of said cavity with the outer surface of said gimbal corresponding substantially to said spherical surface of said cavity, flotation fluid filling the space between said housing and said gimbal and supporting said gimbal from said housing, said hollow being in a state of near vacuum, a gyrowheel disposed centrally within said gimbal, means disposing said gyrowheel for rotation within said gimbal about a spin axis substantially normal to the axis of rotation of said gimbal relative said housing, said gyrowheel comprising a hollow substantiallly cylindrical body with frusto-conical end members, an annular motor stator disposed on the inner surface of said gimbal at the mid-section thereof, an annular rotor disposed on said gyrowheel adjacent said motor stator for coaction therewith, said rotor being adapted to be driven by magnetic fields produced by said motor stator when said motor stator is energized, all parts of said gimbal and said gyro being symmetrically disposed relative said spin axis of said gyroscope and constituting symmetrical surfaces of said revolution.

14. A gyroscope comprising a housing having a spherical cavity, a hollow spherical gimbal disposed within said housing for rotation therein and spaced apart from the spherical surface of said cavity with the outer surface of said gimbal corresponding substantially to said spherical surface of said cavity, flotation fluid filling the space between said housing and said gimbal and supporting said gimbal from said housing, said hollow being in a state of near vacuum, a gyrowheel disposed centrally within said gimbal, means disposing said gyrowheel for rotation within said gimbal about a spin axis substantially normal to the axis of rotation of said gimbal relative said housing, said gyrowheel comprising a hollow substantially cylindrical body with frusto-conical end members, an annular motor stator disposed on the inner surface of said gimbal at the mid-section thereof, an annular motor rotor disposed on said gyrowheel adjacent said motor stator for coaction therewith, said rotor being adapted to be driven by magnetic fields produced by said motor stator when said motor stator is energized, all parts of said gimbal and said gyro being symmetrically disposed relative said spin axis of said gyroscope and constituting symmetrical surfaces of said revolution, means disposed within said housing to supply said flotation fluid to said space between said housing and said gimbal, said housing further comprising a diaphragm dividing said housing into first and second chambers, a passageway coupling said space and said flotation fluid to said first chamber, a source of air supply coupled to said second chamber whereby any temperature use in said flotation fluid due to rotation of said gyrowheel will cause said diaphragm to move accordingly and prevent undesired loading of the bearings of said gyrowheel.

References Cited by the Examiner

UNITED STATES PATENTS

| | | | |
|---|---|---|---|
| 2,835,132 | 5/1958 | Vacquier | 74—5.47 |
| 2,898,765 | 8/1959 | Atkinson | 74—5 |
| 2,933,925 | 4/1960 | Singleton | 74—5.4 |
| 2,999,391 | 9/1961 | Freebairn | 74—5.37 |

FRED C. MATTERN, Jr., *Primary Examiner.*

MILTON KAUFMAN, *Examiner.*

J. D. PUFFER, *Assistant Examiner.*